US008681667B2

(12) United States Patent
Dai et al.

(10) Patent No.: US 8,681,667 B2
(45) Date of Patent: Mar. 25, 2014

(54) METHOD FOR ALLOCATING PHYSICAL HYBRID ARQ INDICATOR CHANNELS

(75) Inventors: Bo Dai, Shenzhen (CN); Shuqiang Xia, Shenzhen (CN); Bin Yu, Shenzhen (CN); Peng Hao, Shenzhen (CN); Chunli Liang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 344 days.

(21) Appl. No.: 12/919,665

(22) PCT Filed: Feb. 13, 2009

(86) PCT No.: PCT/CN2009/070426
§ 371 (c)(1),
(2), (4) Date: Aug. 26, 2010

(87) PCT Pub. No.: WO2009/115001
PCT Pub. Date: Sep. 24, 2009

(65) Prior Publication Data
US 2011/0007674 A1    Jan. 13, 2011

(30) Foreign Application Priority Data

Mar. 20, 2008    (CN) .......................... 2008 1 0087182

(51) Int. Cl.
*H04B 1/44* (2006.01)
*H04L 1/18* (2006.01)
(52) U.S. Cl.
CPC ............ *H04L 1/1812* (2013.01); *H04L 1/1803* (2013.01); *H04L 1/1806* (2013.01); *H04L 1/1809* (2013.01); *H04L 1/1825* (2013.01); *H04L 1/1864* (2013.01)
USPC ........... 370/282; 370/329; 370/334; 370/337; 370/468
(58) Field of Classification Search
CPC .................................................. H04L 1/1812
USPC .................. 370/282, 329, 334, 337, 468; 455/450–509
See application file for complete search history.

(56) References Cited

U.S. PATENT DOCUMENTS

2005/0201474 A1    9/2005    Cho et al.
(Continued)

FOREIGN PATENT DOCUMENTS

CN          101047482 A       10/2007
(Continued)

OTHER PUBLICATIONS

PHICH Assignment for TDD and FDD E-UTRA, Motorola, Jan. 14-18, 2007.*
(Continued)

*Primary Examiner* — Mark Rinehart
*Assistant Examiner* — Mang Yeung
(74) *Attorney, Agent, or Firm* — Hunton & Williams LLP

(57) ABSTRACT

The present disclosure provides a method for allocating physical hybrid ARQ indicator channels, which is used for sending indication information corresponding to multiple uplink sub-frames in the same downlink sub-frame in a TDD system. The method includes: in the TDD system, through an index of a physical resource block where uplink data resides as well as an index of an uplink sub-frame where the uplink data resides, determining an index of a physical hybrid ARQ indicator channel group where a physical hybrid ARQ indicator channel in an downlink sub-frame resides and an intra-group index of the physical hybrid ARQ indicator channel in the physical hybrid ARQ indicator channel group according to an indexing rule, and further determining an index of the physical hybrid ARQ indicator channel by using the index of the physical hybrid ARQ indicator channel group and the intra-group index. According to implicit mapping, the method of the present disclosure implements the allocation of the physical hybrid ARQ indicator channels over which the downlink indication messages corresponding to each uplink sub-frame are transmitted, thereby being capable of overcoming the problem potentially present in existing technologies that multiple indication messages reside on the same physical hybrid ARQ indicator channel.

36 Claims, 5 Drawing Sheets

(56) References Cited

U.S. PATENT DOCUMENTS

| | | |
|---|---|---|
| 2006/0195767 A1 | 8/2006 | Ihm et al. |
| 2007/0286066 A1 | 12/2007 | Zhang et al. |
| 2008/0059859 A1 | 3/2008 | Marinier et al. |
| 2009/0046793 A1* | 2/2009 | Love et al. .................. 375/260 |
| 2009/0109906 A1* | 4/2009 | Love et al. .................. 370/329 |

FOREIGN PATENT DOCUMENTS

| | | |
|---|---|---|
| CN | 101252422 A | 8/2008 |
| EP | 1533966 A2 | 5/2005 |
| EP | 1679932 A1 | 7/2006 |
| JP | 2007166233 A | 6/2007 |
| JP | 2008526090 A | 7/2008 |
| RU | 2316116 C2 | 1/2008 |
| WO | 2006071049 A | 7/2006 |

OTHER PUBLICATIONS

Motorola, Downlink Resource Allocation Mapping for E-UTRA, Aug. 20-29, 2007.*
Motorola, MU-MIMO PHICH Assignment for Adaptive and non-Adaptive HARQ, Aug. 20-24, 2007.*
PHICH Assignment for TDD and FDD E-UTRA Feb. 11-15, 2008.
PHICH Assignment for TDD and FDD E-UTRA Jan. 14-18, 2007.
International Search Report on international application No. PCT/CN2009/070426, mailed on May 21, 2009.
English Translation of the Written Opinion of the International Search Authority in international application No. PCT/CN2009/070426, mailed on May 21, 2009.
3GPP, RAN WG1 #52 R1-081071, Way forward on PHICH allocation.
Evolved Universal Terrestrial Radio Access Sep. 2006.

* cited by examiner

Fig. 2

| | Target downlink sub-frame | | Uplink sub-frame #0 | Uplink sub-frame #1 | |
|---|---|---|---|---|---|
| Physical hybrid ARQ indicator channel 0 | 0 | 24 | 0 | 24 | Physical resource block 0 |
| Physical hybrid ARQ indicator channel 1 | 3 | 27 | 1 | 25 | Physical resource block 1 |
| Physical hybrid ARQ indicator channel 2 | 6 | 30 | 2 | 26 | Physical resource block 2 |
| Physical hybrid ARQ indicator channel 3 | 9 | 33 | 3 | 27 | Physical resource block 3 |
| Physical hybrid ARQ indicator channel 4 | 12 | 36 | 4 | 28 | Physical resource block 4 |
| Physical hybrid ARQ indicator channel 5 | 15 | 39 | 5 | 29 | Physical resource block 5 |
| Physical hybrid ARQ indicator channel 6 | 18 | 42 | 6 | 30 | Physical resource block 6 |
| Physical hybrid ARQ indicator channel 7 | 21 | 45 | 7 | 31 | Physical resource block 7 |
| | Physical hybrid ARQ indicator channel group #0 | Physical hybrid ARQ indicator channel group #3 | 8 | 32 | Physical resource block 8 |
| Physical hybrid ARQ indicator channel 0 | 1 | 25 | 9 | 33 | Physical resource block 9 |
| Physical hybrid ARQ indicator channel 1 | 4 | 28 | 10 | 34 | Physical resource block 10 |
| Physical hybrid ARQ indicator channel 2 | 7 | 31 | 11 | 35 | Physical resource block 11 |
| Physical hybrid ARQ indicator channel 3 | 10 | 34 | 12 | 36 | Physical resource block 12 |
| Physical hybrid ARQ indicator channel 4 | 13 | 37 | 13 | 37 | Physical resource block 13 |
| Physical hybrid ARQ indicator channel 5 | 16 | 40 | 14 | 38 | Physical resource block 14 |
| Physical hybrid ARQ indicator channel 6 | 19 | 43 | 15 | 39 | Physical resource block 15 |
| Physical hybrid ARQ indicator channel 7 | 22 | 46 | 16 | 40 | Physical resource block 16 |
| | Physical hybrid retransmission channel group #1 | Physical hybrid retransmission channel group #4 | 17 | 41 | Physical resource block 17 |
| Physical hybrid ARQ indicator channel 0 | 2 | 26 | 18 | 42 | Physical resource block 18 |
| Physical hybrid ARQ indicator channel 1 | 5 | 29 | 19 | 43 | Physical resource block 19 |
| Physical hybrid ARQ indicator channel 2 | 8 | 32 | 20 | 44 | Physical resource block 20 |
| Physical hybrid ARQ indicator channel 3 | 11 | 35 | 21 | 45 | Physical resource block 21 |
| Physical hybrid ARQ indicator channel 4 | 14 | 38 | 22 | 46 | Physical resource block 22 |
| Physical hybrid ARQ indicator channel 5 | 17 | 41 | 23 | 47 | Physical resource block 23 |
| Physical hybrid ARQ indicator channel 6 | 20 | 44 | | | |
| Physical hybrid ARQ indicator channel 7 | 23 | 47 | | | |
| | Physical hybrid ARQ indicator channel group #2 | Physical hybrid ARQ indicator channel group #5 | | | |

Fig. 4

|  | Target downlink sub-frame | |
|---|---|---|
| Physical hybrid ARQ indicator channel 0 | 0 | 3 |
| Physical hybrid ARQ indicator channel 1 | 6 | 9 |
| Physical hybrid ARQ indicator channel 2 | 12 | 15 |
| Physical hybrid ARQ indicator channel 3 | 18 | 21 |
| Physical hybrid ARQ indicator channel 4 | 24 | 27 |
| Physical hybrid ARQ indicator channel 5 | 30 | 33 |
| Physical hybrid ARQ indicator channel 6 | 36 | 39 |
| Physical hybrid ARQ indicator channel 7 | 42 | 45 |
|  | Physical hybrid ARQ indicator channel group #0 | Physical hybrid ARQ indicator channel group #3 |

| Physical hybrid ARQ indicator channel 0 | 1 | 4 |
|---|---|---|
| Physical hybrid ARQ indicator channel 1 | 7 | 10 |
| Physical hybrid ARQ indicator channel 2 | 13 | 16 |
| Physical hybrid ARQ indicator channel 3 | 19 | 22 |
| Physical hybrid ARQ indicator channel 4 | 25 | 28 |
| Physical hybrid ARQ indicator channel 5 | 31 | 34 |
| Physical hybrid ARQ indicator channel 6 | 37 | 40 |
| Physical hybrid ARQ indicator channel 7 | 43 | 46 |
|  | Physical hybrid ARQ indicator channel group #1 | Physical hybrid ARQ indicator channel group #4 |

| Physical hybrid ARQ indicator channel 0 | 2 | 5 |
|---|---|---|
| Physical hybrid ARQ indicator channel 1 | 8 | 11 |
| Physical hybrid ARQ indicator channel 2 | 14 | 17 |
| Physical hybrid ARQ indicator channel 3 | 20 | 23 |
| Physical hybrid ARQ indicator channel 4 | 26 | 29 |
| Physical hybrid ARQ indicator channel 5 | 32 | 35 |
| Physical hybrid ARQ indicator channel 6 | 38 | 41 |
| Physical hybrid ARQ indicator channel 7 | 44 | 47 |
|  | Physical hybrid ARQ indicator channel group #2 | Physical hybrid ARQ indicator channel group #5 |

| Uplink sub-frame #0 | Uplink sub-frame #1 | |
|---|---|---|
| 0 | 1 | Physical resource block 0 |
| 2 | 3 | Physical resource block 1 |
| 4 | 5 | Physical resource block 2 |
| 6 | 7 | Physical resource block 3 |
| 8 | 9 | Physical resource block 4 |
| 10 | 11 | Physical resource block 5 |
| 12 | 13 | Physical resource block 6 |
| 14 | 15 | Physical resource block 7 |
| 16 | 17 | Physical resource block 8 |
| 18 | 19 | Physical resource block 9 |
| 20 | 21 | Physical resource block 10 |
| 22 | 23 | Physical resource block 11 |
| 24 | 25 | Physical resource block 12 |
| 26 | 27 | Physical resource block 13 |
| 28 | 29 | Physical resource block 14 |
| 30 | 31 | Physical resource block 15 |
| 32 | 33 | Physical resource block 16 |
| 34 | 35 | Physical resource block 17 |
| 36 | 37 | Physical resource block 18 |
| 38 | 39 | Physical resource block 19 |
| 40 | 41 | Physical resource block 20 |
| 42 | 43 | Physical resource block 21 |
| 44 | 45 | Physical resource block 22 |
| 46 | 47 | Physical resource block 23 |

Fig. 5

| | Target downlink sub-frame | | Uplink sub-frame #0 | Uplink sub-frame #1 | |
|---|---|---|---|---|---|
| Physical hybrid ARQ indicator channel 0 | 0 | 6 | 0 | 1 | Physical resource block 0 |
| Physical hybrid ARQ indicator channel 1 | 1 | 7 | 2 | 3 | Physical resource block 1 |
| Physical hybrid ARQ indicator channel 2 | 12 | 18 | | | |
| Physical hybrid ARQ indicator channel 3 | 13 | 19 | 4 | 5 | Physical resource block 2 |
| Physical hybrid ARQ indicator channel 4 | 24 | 30 | 6 | 7 | Physical resource block 3 |
| Physical hybrid ARQ indicator channel 5 | 25 | 31 | | | |
| Physical hybrid ARQ indicator channel 6 | 36 | 42 | 8 | 9 | Physical resource block 4 |
| Physical hybrid ARQ indicator channel 7 | 37 | 43 | | | |
| | Physical hybrid ARQ indicator channel group #0 | Physical hybrid ARQ indicator channel group #3 | 10 | 11 | Physical resource block 5 |
| | | | 12 | 13 | Physical resource block 6 |
| | | | 14 | 15 | Physical resource block 7 |
| Physical hybrid ARQ indicator channel 0 | 2 | 8 | 16 | 17 | Physical resource block 8 |
| Physical hybrid ARQ indicator channel 1 | 3 | 9 | 18 | 19 | Physical resource block 9 |
| Physical hybrid ARQ indicator channel 2 | 14 | 20 | | | |
| Physical hybrid ARQ indicator channel 3 | 15 | 21 | 20 | 21 | Physical resource block 10 |
| Physical hybrid ARQ indicator channel 4 | 26 | 32 | 22 | 23 | Physical resource block 11 |
| Physical hybrid ARQ indicator channel 5 | 27 | 33 | | | |
| Physical hybrid ARQ indicator channel 6 | 38 | 44 | 24 | 25 | Physical resource block 12 |
| Physical hybrid ARQ indicator channel 7 | 39 | 45 | 26 | 27 | Physical resource block 13 |
| | Physical hybrid ARQ indicator channel group #1 | Physical hybrid ARQ indicator channel group #4 | 28 | 29 | Physical resource block 14 |
| | | | 30 | 31 | Physical resource block 15 |
| | | | 32 | 33 | Physical resource block 16 |
| Physical hybrid ARQ indicator channel 0 | 4 | 10 | 34 | 35 | Physical resource block 17 |
| Physical hybrid ARQ indicator channel 1 | 5 | 11 | | | |
| Physical hybrid ARQ indicator channel 2 | 16 | 22 | 36 | 37 | Physical resource block 18 |
| Physical hybrid ARQ indicator channel 3 | 17 | 23 | 38 | 39 | Physical resource block 19 |
| Physical hybrid ARQ indicator channel 4 | 28 | 34 | | | |
| Physical hybrid ARQ indicator channel 5 | 29 | 35 | 40 | 41 | Physical resource block 20 |
| Physical hybrid ARQ indicator channel 6 | 40 | 46 | 42 | 43 | Physical resource block 21 |
| Physical hybrid ARQ indicator channel 7 | 41 | 47 | | | |
| | Physical hybrid ARQ indicator channel group #2 | Physical hybrid ARQ indicator channel group #5 | 44 | 45 | Physical resource block 22 |
| | | | 46 | 47 | Physical resource block 23 |

METHOD FOR ALLOCATING PHYSICAL HYBRID ARQ INDICATOR CHANNELS

TECHNICAL FIELD

The present disclosure relates to the field of mobile communications, and specifically to a method for allocating physical hybrid Automatic Repeat Request (ARQ) indicator channels in broadband wireless systems.

BACKGROUND

In a Hybrid Automatic Repeat Request (HARQ) mode, a code sent by a sender not only can detect errors but also has a certain error correcting capability. After receiving code words, a decoder of a receiver first detects errors, if they are within the error correcting capability of the code, the decoder automatically performs error correction; if there are many errors that exceed the error correcting capability of the code but can still be detected, the receiver sends a decision signal to the sender through a feedback channel, requesting the sender to retransmit information.

In an Orthogonal Frequency Division Multiplexing (OFDM) system, Acknowledged/Non-acknowledged (ACK/NACK) control signaling is used to indicate whether information transmission is correct or incorrect, in this way, it can be judged whether retransmission is necessary.

Currently, it is specified in a Long Term Evolution (LTE) system that an ACK/NACK message related to uplink data is transmitted over a physical hybrid ARQ indicator channel. There are two methods for allocating physical hybrid ARQ indicator channels, one is indicated through explicit signaling, while the other is indicated through implicit mapping, and the latter method does not require extra overhead relative to the former, thus is more advantageous.

There are primarily two methods for the implicit mapping: the first implicit mapping method is that the implicit mapping is performed through an index of a control logic unit where uplink authorization control signaling resides; the second implicit mapping method is that the implicit mapping is performed jointly through the lowest serial number of physical resource blocks where the uplink data resides and cyclic shift of uplink data reference signals. Since an uplink HARQ is synchronous self-adaptive, when retransmitting data, the sender does not require new control signaling to indicate the position where the retransmitted data is sent, but transfers the retransmitted data in a position where the initial transmission was performed, and in a time division duplex system, this may result in a situation that uplink time slots and downlink time slots are not equal because there are many configurations for the ratio of the uplink time slots to the downlink time slots.

During data is retransmitted according to the first implicit mapping method, a situation may occur that the ACK/NACK message of the retransmitted data and the ACK/NACK message of new data are mapped to the same Physical Hybrid ARQ Indicator Channel (PHICH) so that a target user can not acquire the correct ACK/NACK message.

For the second implicit mapping method in a time division duplex system, when the ratio of the uplink time slots to the downlink time slots is 3:1, a situation may occur that the ACK/NACK messages of data in different uplink sub-frames are mapped to the same PHICH so that a target user can not acquire the correct ACK/NACK message.

In view of this, it is necessary to provide a more sophisticated solution to solve the problem of allocating physical hybrid ARQ indicator channels in the time division duplex system.

SUMMARY

The technical problem that the present disclosure intends to resolve is providing a method for allocating physical hybrid ARQ indicator channels, when downlink indication messages corresponding to multiple uplink sub-frames in the time division duplex system correspond to the same downlink sub-frame, according to implicit mapping the method can implement the allocation of indices of the physical hybrid ARQ indicator channels over which the downlink indication messages corresponding to each uplink sub-frame are transmitted, thereby being capable of overcoming the problem potentially present in existing technologies that multiple indication messages reside on the same physical hybrid ARQ indicator channel.

In order to solve the above mentioned problem, the present disclosure provides a method for allocating physical hybrid ARQ indicator channels, which is used for indexing physical hybrid ARQ indicator channels where ACK/NACK indication messages related to uplink data reside.

The present disclosure provides a method for allocating physical hybrid ARQ indicator channels, which is used for sending indication information corresponding to multiple uplink sub-frames in the same downlink sub-frame in a time division duplex system, and the method includes:

in the time division duplex system, through an index of a physical resource block where uplink data resides as well as an index of an uplink sub-frame where the uplink data resides, determining an index of a physical hybrid ARQ indicator channel group where a physical hybrid ARQ indicator channel in an downlink sub-frame resides and an intra-group index of the physical hybrid ARQ indicator channel in the physical hybrid ARQ indicator channel group according to an indexing rule, and further determining an index of the physical hybrid ARQ indicator channel by using the index of the physical hybrid ARQ indicator channel group and the intra-group index.

Furthermore, in the allocation method, when determining the index of the physical hybrid ARQ indicator channel group where the physical hybrid ARQ indicator channel in the downlink sub-frame resides as well as the intra-group index of the physical hybrid ARQ indicator channel, it may be also necessary to use an index of cyclic shift for reference signal field to which the uplink data corresponds.

Furthermore, in the allocation method, the indexing rule may be first indexing according to uplink sub-frame numbers and then indexing according to physical resource blocks.

Furthermore, when implementing allocation of specific physical hybrid ARQ indicator channels according to the indexing rule, the method may include:

determining k, which is the number of the uplink sub-frames whose corresponding indication messages are transmitted in the same downlink sub-frame, and renumbering the k uplink sub-frames to get IndexUSF, which denotes an uplink sub-frame index;

determining the number of available physical hybrid ARQ indicator channel groups used for sending downlink indication messages in target downlink sub-frame, and continuously and uniformly allocating the available physical hybrid ARQ indicator channel groups to the k uplink sub-frames according to the sequence of the IndexUSF;

according to the sequence of the IndexUSF, sequentially numbering all physical resource blocks in one uplink sub-frame after another, and determining physical resource block indices for all physical resource blocks;

uniformly allocating the indices of all physical resource blocks in each uplink sub-frame to all physical hybrid retransmission channel groups to which the uplink sub-frame corresponds, and sequentially mapping indices of corresponding physical resource blocks in a physical hybrid ARQ indicator channel group to physical hybrid retransmission channels in the group;

adjusting positions between and inside the physical hybrid retransmission channel groups according to the index of the cyclic shift for reference signal field to which the uplink data corresponds.

Furthermore, the allocation method may specifically include:

determining k that is the number of the uplink sub-frames, and renumbering the k uplink sub-frames to get IndexUSF;

determining NPRB that is the total number of available resource blocks within a current system bandwidth, Index1st PRB that is the lowest numbering index of the physical resource blocks where uplink data in the uplink sub-frame resides, and IndexDMRS that is the index of the cyclic shift for reference signal field to which the uplink data corresponds;

determining Ngroup that is the total number of available physical hybrid ARQ indicator channel groups when the downlink sub-frame only corresponds to one uplink sub-frame as well as Nlocal that is the number of physical hybrid ARQ indicator channels contained in one physical hybrid ARQ indicator channel group;

then determining Indexgroup, which is an index of a physical hybrid ARQ indicator channel group in the downlink sub-frame, with the following expression:

Indexgroup=(Index1stPRB+IndexDMRS)mod Ngroup+Ngroup×IndexUSF;

determining Indexlocal, which is an index of a channel in the physical hybrid ARQ indicator channel group, with the following expression:

Indexlocal=(⌊Index1stPRB/Ngroup⌋+IndexDMRS) mod Nlocal;

further ultimately determining IndexPHICH, which is the index of the physical hybrid ARQ indicator channel, with the following expression:

IndexPHICH=Indexgroup+Indexlocal×Ngroup; or

IndexPHICH=Ngroup×Nlocal×IndexUSF+Indexgroup−Ngroup×IndexUSF+Indexlocal×Ngroup;

where the ⌊ ⌋ means rounding-down, and the operator mod means modulo operation.

Furthermore, when implementing allocation of specific physical hybrid ARQ indicator channels according to the indexing rule, the method may include:

determining k, which is the number of uplink sub-frames whose corresponding downlink indication messages are transmitted in the same downlink sub-frame, and renumbering the k uplink sub-frames to get IndexUSF, which denotes an uplink sub-frame index;

according to the sequence of the IndexUSF, serially connecting physical resource blocks in all uplink sub-frames whose corresponding indication messages need to be transmitted in the same downlink sub-frame together and sequentially numbering them to get the indices of the physical resource blocks;

according to the sequence of the index of each uplink sub-frame, uniformly allocating the indices of all physical resource blocks in all uplink sub-frames to all physical hybrid ARQ indicator channel groups to which all uplink sub-frames correspond, and sequentially mapping the indices of corresponding physical resource blocks in a physical hybrid ARQ indicator channel group to the physical hybrid ARQ indicator channels in the group;

finally, adjusting positions between and inside the physical hybrid ARQ indicator channel groups according to the index of the cyclic shift for reference signal field to which the uplink data corresponds.

Furthermore, the allocation method may specifically include:

determining k that is the number of the uplink sub-frames, and renumbering the k uplink sub-frames to get IndexUSF;

determining NPRB that is the total number of available resource blocks within a current system bandwidth, Index1st PRB that is the lowest numbering index of the physical resource blocks where uplink data in the uplink sub-frame resides, and IndexDMRS that is the index of the cyclic shift for reference signal field to which the uplink data corresponds;

determining Ngroup that is the total number of available physical hybrid ARQ indicator channel groups in the downlink sub-frame as well as Nlocal that is the number of physical hybrid ARQ indicator channels contained in one physical hybrid ARQ indicator channel group;

then first determining IndexPRB, which is an index of a physical resource block in the uplink sub-frame, with the following expression:

IndexPRB=Index1stPRB+IndexUSF×NPRB determining Indexgroup, which is an index of the physical hybrid ARQ indicator channel group in the downlink sub-frame, with the following expression:

Indexgroup=(IndexPRB+IndexDMRS)mod Ngroup;

determining Indexlocal, which is an index of a channel in the physical hybrid ARQ indicator channel group, with the following expression:

Indexlocal=(⌊IndexPRB/Ngroup⌋+IndexDMRS)mod Nlocal;

further ultimately determining IndexPHICH, which is the index of the physical hybrid ARQ indicator channel, with the following expression:

IndexPHICH=Indexgroup+Indexlocal×Ngroup;

where the ⌊ ⌋ means rounding-down, and the operator mod means modulo operation.

Furthermore, in the allocation method, the indexing rule may be first indexing according to physical resource blocks and then indexing according to uplink sub-frame numbers.

Furthermore, when implementing allocation of specific physical hybrid ARQ indicator channels according to the indexing rule, the method may include:

determining k, which is the number of uplink sub-frames whose corresponding indication messages are transmitted in the same downlink sub-frame, and renumbering the k uplink sub-frames to get IndexUSF, which denotes an uplink sub-frame index;

according to the sequence of the IndexUSF, serially connecting all physical resource blocks in the same position in all uplink sub-frames together according to the IndexUSF and sequentially numbering them to get the indices of the physical resource blocks;

according to the sequence of the index of each uplink sub-frame, uniformly allocating the indices of all physical resource blocks in all uplink sub-frames to all physical hybrid ARQ indicator channel groups to which all uplink sub-frames correspond; and sequentially mapping the indices of corresponding physical resource blocks in a physical hybrid ARQ indicator channel group to the physical hybrid ARQ indicator channels in the group;

finally, adjusting positions between and inside the physical hybrid ARQ indicator channel groups according to the index of the cyclic shift for reference signal field to which the uplink data corresponds.

Furthermore, the allocation method may specifically include:

determining k that is the number of the uplink sub-frames, and renumbering the k uplink sub-frames to get IndexUSF;

determining NPRB that is the total number of available resource blocks within a current system bandwidth, Index1st PRB that is the lowest numbering index of the physical resource blocks where uplink data in the uplink sub-frame resides, and IndexDMRS that is the index of the cyclic shift for reference signal field to which the uplink data corresponds;

determining Ngroup that is the total number of available physical hybrid ARQ indicator channel groups in the downlink sub-frame as well as Nlocal that is the number of physical hybrid retransmission indicator channels contained in one physical hybrid retransmission indicator channel group;

then first determining IndexPRB, which is an index of a physical resource block in the uplink sub-frame, with the following expression:

IndexPRB=Index1stPRB×k+IndexUSF;

determining Indexgroup, which is an index of a physical hybrid ARQ indicator channel group in the downlink sub-frame, with the following expression:

Indexgroup=(IndexPRB+IndexDMRS)mod Ngroup;

determining Indexlocal, which is an index of a channel in the physical hybrid ARQ indicator channel group, with the following expression:

Indexlocal=(⌊IndexPRB/Ngroup⌋+IndexDMRS)mod Nlocal;

further, ultimately determining IndexPHICH, which is the index of the physical hybrid ARQ indicator channel, with the following expression:

IndexPHICH=Indexgroup+Indexlocal×Ngroup;

where the ⌊ ⌋ means rounding-down, and the operator mod means modulo operation.

Furthermore, when implementing allocation of specific physical hybrid ARQ indicator channels according to the indexing rule, the method may include:

determining k, which is the number of uplink sub-frames whose corresponding indication messages are transmitted in the same downlink sub-frame, and renumbering the k uplink sub-frames to get IndexUSF, which denotes an uplink sub-frame index;

according to the sequence of the IndexUSF, serially connecting all physical resource blocks in the same position in all uplink sub-frames together according to the IndexUSF and sequentially numbering them to get the indices of the physical resource blocks;

according to the sequence of the index of each uplink sub-frame, uniformly allocating the indices of all physical resource blocks in all uplink sub-frames in pairs to all physical hybrid ARQ indicator channel groups to which all uplink sub-frames correspond; and sequentially mapping the indices of corresponding physical resource blocks in a physical hybrid ARQ indicator channel group to the physical hybrid ARQ indicator channels in the group;

finally, adjusting positions between and inside the physical hybrid ARQ indicator channel groups according to the index of the cyclic shift for reference signal field to which the uplink data corresponds.

Furthermore, the allocation method may specifically include:

determining k that is the number of the uplink sub-frames and renumbering the k uplink sub-frames to get IndexUSF;

determining NPRB that is the total number of available resource blocks within a current system bandwidth, Index1st PRB that is the lowest numbering index of the physical resource blocks where uplink data in the uplink sub-frame resides, and IndexDMRS that is the index of the cyclic shift for reference signal field to which the uplink data corresponds;

determining Ngroup that is the total number of available physical hybrid ARQ indicator channel groups in the downlink sub-frame as well as Nlocal that is the number of physical hybrid ARQ indicator channels contained in one physical hybrid ARQ indicator channel group; then determining Indexgroup, which is an index of a physical hybrid ARQ indicator channel group in the downlink sub-frame, with the following expression:

Indexgroup=(Index1stPRB+IndexDMRS)mod Ngroup;

determining Indexlocal, which is an index of a channel in the physical hybrid ARQ indicator channel group, with the following expression:

Indexlocal=(⌊Index1stPRB/Ngroup⌋×k+IndexUSF+ IndexDMRS)mod Nlocal;

further ultimately determining IndexPHICH, which is the index of the physical hybrid retransmission indicator channel, with the following expression:

IndexPHICH=Indexgroup+Indexlocal×Ngroup; or

IndexPHICH=Indexgroup×k+IndexUSF+⌊Indexlocal/ k⌋×k×Ngroup;

where the ⌊ ⌋ means rounding-down, and the operator mod means modulo operation.

Furthermore, in the allocation method, the indication information corresponding to multiple uplink sub-frames sent in the same downlink sub-frame in the time division duplex system may be an ACK/NACK message responding to the uplink data in the uplink sub-frame. The uplink sub-frames may be continuous uplink sub-frames, the number of the uplink sub-frames k may be 1 or 2, and Nlocal which is the number of the physical hybrid ARQ indicator channels contained in the physical hybrid retransmission indicator channel group may be 8. The numbering rule for renumbering the k uplink sub-frames to get IndexUSF may be that: successively numbering the k uplink sub-frames with #0, . . . , #k−1, i.e. the range of values of IndexUSF being from 0 to k−1.

Furthermore, in the allocation method, the value of the index of the cyclic shift for reference signal field to which the uplink data corresponds may also be set as 0 in the above mentioned expressions, which is equivalent to saying that there is no such IndexDMRS variable in the expressions.

Furthermore, in the allocation method, the index of the physical resource block where the uplink data in the uplink sub-frame resides may be a physical resource block index with the largest number or a physical resource block index with the lowest number in the physical resource blocks where uplink data in an uplink sub-frame resides; the physical resource block index with the largest or lowest number may mark the starting block or ending block of the physical resource blocks to which the uplink data in the uplink sub-frames corresponds.

By applying the method for allocating physical hybrid ARQ indicator channels of the present disclosure, the index of the physical resource block where uplink data resides, the index of the cyclic shift for reference signal field to which the uplink data corresponds, and the index of the uplink sub-frame where the uplink data resides are used together to jointly indicate the index of the physical hybrid ARQ indicator channel used for transmitting the ACK/NACK message of the uplink data. Because of the addition of the index of the uplink sub-frame as compared to existing technologies, the method allows more accurate allocation of physical hybrid ARQ indicator channels, avoids channel allocation conflicts, thereby being capable of reducing signaling overhead, and also being suitable for scenarios where the ratio of uplink time slots to downlink time slots is unequal.

BRIEF DESCRIPTION OF THE DRAWINGS

FIG. 2 is a schematic illustration of application example 1 of the method for allocating physical hybrid ARQ indicator channels of the present disclosure;

FIG. 4 is a schematic illustration of application example 3 of the method for allocating physical hybrid ARQ indicator channels of the present disclosure; and FIG. 5 is a schematic illustration of application example 4 of the method for allocating physical hybrid ARQ indicator channels of the present disclosure.

DETAILED DESCRIPTION

The present disclosure will be further described in more detail below in combination with the attached drawings in order to clarify the purpose, technical scheme and advantages of the present disclosure more clearly.

In order to overcome the problem in existing technologies that chaos results from transmission of multiple indication messages over the same physical hybrid ARQ indicator channel when Acknowledged/Non-acknowledged (ACK/NACK) indication messages corresponding to uplink sub-frames are transmitted in a downlink sub-frame in a time division duplex system, the present disclosure provides a method for allocating physical hybrid ARQ indicator channels, which is used for indexing the physical hybrid ARQ indicator channels where the ACK/NACK messages related to uplink data reside, thereby implementing the allocation of physical hybrid ARQ indicator channels for downlink indication messages, and avoiding transmission chaos of the ACK/NACK messages.

Figure 1:
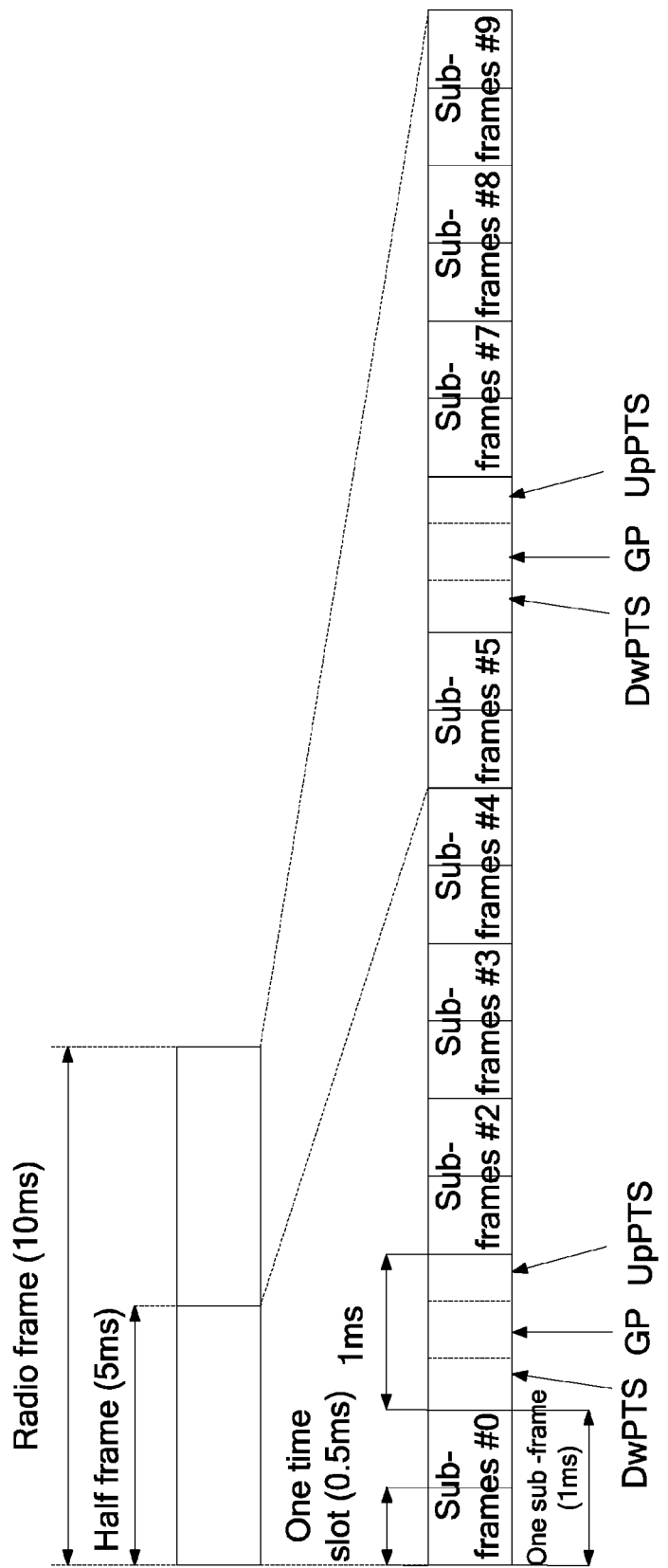
FIG. 1 is a schematic illustration of a radio frame in the time division duplex system.

An important characteristic of the Time Division Duplex (TDD) system is that the sub-frames used for uplink/downlink transmission are configurable. The frame structure of the time division duplex system in the current LTE (Long Term Evolution) is as shown in FIG. 1. A 10 ms radio frame is divided into two half frames equally of a length of 5 ms, while each 5 ms half frame contains 8 normal time slots and 3 special time slots: DwPTS, GP and UpPTS. The sum of duration of these three special time slots is 1 ms, and every two continuous normal time slots form a subframe of a length of 1 ms. Wherein sub-frame #0 and sub-frame #5 in a radio frame as well as the DwPTS in the special time slot are always reserved for downlink time slots.

In the TDD system, since there are many configurations of the ratio of uplink time slots to downlink time slots, such as a number allocation of uplink time slots and downlink time slots in the radio frame as shown in FIG. 1, which only serves as an example, and since there are many configurations for the ratio of the uplink time slots to the downlink time slots, a base station, after receiving data through an uplink sub-frame, for example, requires to send an ACK/NACK indication message to a terminal through a downlink sub-frame, while the ACK/NACK indication message is carried over an indicator channel among several physical hybrid ARQ indicator channels in the downlink sub-frame.

In order to ensure correct transmission and prevent multiple ACK/NACK indication messages from being carried over the same physical hybrid ARQ indicator channel, in the TDD system, the present disclosure allows the index of the physical resource block where uplink data resides, the index of the cyclic shift for reference signal field to which the uplink data corresponds, and the index of the uplink sub-frame where the uplink data resides to be used together to jointly indicate the index of the physical hybrid ARQ indicator channel which is used for transmitting the ACK/NACK message of the uplink data. Compared to existing technologies, the method allows more accurate allocation of physical hybrid ARQ indicator channels, thereby avoiding channel allocation conflicts because of the addition of the index of the uplink sub-frame.

Based on the above, the present disclosure provides two practical technical schemes, while each technical scheme further provides two configuration approaches. The specific technical schemes of the present disclosure are described in detail below.

Technical Scheme 1

When the ACK/NACK messages corresponding to two continuous uplink sub-frames are mapped to the same downlink sub-frame, the allocation of the physical hybrid ARQ indicator channels is performed according to the way of first indexing the uplink sub-frame numbers and then indexing the physical resource blocks.

The First Configuration Approach

First, determining k, which is the number of the uplink sub-frames whose corresponding ACK/NACK messages are transmitted in the same downlink sub-frame, and renumbering the k uplink sub-frames (#0, . . . , #k−1), wherein the index of the uplink sub-frame where a user sends data is IndexUSF (i.e. #0, . . . , #k−1) after renumbering;

then, determining Ngroup, which is the number of available physical hybrid ARQ indicator channel groups used for sending downlink ACK/NACK messages in target downlink sub-frame, and sequentially and uniformly classifying the Ngroup available physical hybrid ARQ indicator channel groups into k types according to the IndexUSF, allocating Ngroup/k physical hybrid ARQ indicator channel groups to each uplink sub-frame, where the number of physical hybrid ARQ indicator channels contained in a physical hybrid ARQ indicator channel group is Nlocal, and the ACK/NACK message to which each uplink sub-frame corresponds is transmitted over the physical hybrid ARQ indicator channel in the corresponding channel group of a corresponding type;

after that, according to the sequence of the IndexUSF, sequentially numbering all physical resource blocks in one uplink sub-frame after another, i.e. first sequentially numbering all physical resource blocks in the first uplink sub-frame, continuing to number all physical resource blocks in the second uplink sub-frame following the serial numbers of the physical resource blocks in the first uplink sub-frame, until the numbering of all physical resource blocks in all uplink sub-frames being completed, i.e. having determined indices of all physical resource blocks;

then, uniformly allocating the indices of all physical resource blocks in each uplink sub-frame to all physical hybrid ARQ indicator channel groups to which the uplink sub-frame corresponds, and sequentially mapping the indices of corresponding physical resource blocks in a physical hybrid ARQ indicator channel group to physical hybrid ARQ indicator channels in the group;

then, adjusting positions between and inside the physical hybrid ARQ indicator channel groups according to the index of the cyclic shift for reference signal field to which the uplink data corresponds.

The total number of available resource blocks within a current system bandwidth is NPRB; the total number of available physical hybrid ARQ indicator channel groups is Ngroup when the target downlink sub-frame only corresponds to one uplink sub-frame; the lowest numbering index of the physical resource blocks to which the uplink sub-frame with an index of IndexUSF among the k uplink sub-frames corresponds is Index1st PRB; the index of the cyclic shift for reference signal field to which the uplink data corresponds is IndexDMRS; the number of the physical ARQ indicator channels contained in a physical hybrid ARQ indicator channel group is Nlocal;

in the target downlink sub-frame, the index of the physical hybrid ARQ indicator channel over which the ACK/NACK messages are sent is IndexPHICH, the index of the corresponding physical hybrid ARQ indicator channel group is Indexgroup, the index of the physical hybrid ARQ indicator channel within the physical hybrid ARQ indicator channel group is Indexlocal, then according to the first configuration approach, what can be obtained is that:

Indexgroup=(Index1stPRB+IndexDMRS)mod Ngroup+Ngroup×IndexUSF

Indexlocal=(⌊Index1stPRB/Ngroup⌋+IndexDMRS) mod Nlocal

IndexPHICH=Indexgroup+Indexlocal×Ngroup, or

IndexPHICH=Ngroup×Nlocal×IndexUSF+Indexgroup−Ngroup×IndexUSF+Indexlocal×Ngroup;

in the above definition, k=1, 2; Nlocal=8.

The Second Configuration Approach

First, determining k, which is the number of the uplink sub-frames whose corresponding ACK/NACK messages are transmitted in the same downlink sub-frame, and renumbering the k uplink sub-frames (#0, . . . , #k−1), wherein the index of the uplink sub-frame where the user sends data is IndexUSF (i.e. #0, . . . , #k−1) after renumbering;

according to the sequence of the IndexUSF, serially connecting the physical resource blocks in all uplink sub-frames whose corresponding ACK/NACK messages need to be transmitted in the same downlink sub-frame together and sequentially numbering them to get the indices of the physical resource blocks;

then, according to the sequence of the index of each uplink sub-frame, uniformly allocating the indices of all physical resource blocks in all uplink sub-frames to all physical hybrid ARQ indicator channel groups to which all uplink sub-frames correspond, and sequentially mapping the indices of corresponding physical resource blocks in a physical hybrid ARQ indicator channel group to the physical hybrid ARQ indicator channels in the group;

finally, adjusting positions between and inside the physical hybrid ARQ indicator channel groups according to the index of the cyclic shift for reference signal field to which the uplink data corresponds.

When the second configuration approach is implemented actually, the k uplink sub-frames are renumbered first (#0, . . . , #k−1), whose corresponding ACK/NACK messages need to be transmitted in the same downlink sub-frame, assuming that the total number of available resource blocks within the current system bandwidth is NPRB, the total number of available physical hybrid ARQ indicator channel groups in the target downlink sub-frame is Ngroup, the index of the uplink sub-frame where the user sends data is IndexUSF after renumbering, the lowest numbering index of the physical resource blocks to which the uplink sub-frame with an index of IndexUSF corresponds is Index1st PRB, the index of the cyclic shift for reference signal field to which the uplink data corresponds is IndexDMRS; the number of physical hybrid ARQ indicator channels contained in a physical hybrid ARQ indicator channel group is Nlocal.

In the target downlink sub-frame, the index of the physical hybrid ARQ indicator channel over which the ACK/NACK messages are sent is IndexPHICH, the index of the corresponding physical hybrid ARQ indicator channel group is Indexgroup, and the index of the physical hybrid ARQ indicator channel within the physical hybrid ARQ indicator channel group is Indexlocal, then according to the second configuration approach, IndexPHICH, the index of the physical hybrid ARQ indicator channel, can be determined with the following formulae:

IndexPRB=Index1stPRB+IndexUSF×NPRB

Indexgroup=(IndexPRB+IndexDMRS)mod Ngroup

Indexlocal=(⌊IndexPRB/Ngroup⌋+IndexDMRS)mod Nlocal

IndexPHICH=Indexgroup+Indexlocal×Ngroup;

in the above definition, k=1, 2; Nlocal=8.

Technical Scheme 2

When the ACK/NACK messages corresponding to two continuous uplink sub-frames are mapped to the same downlink sub-frame, the allocation of the physical hybrid ARQ indicator channels is performed according to the way of first indexing the physical resource blocks and then indexing the uplink sub-frame numbers.

Examples of two continuous uplink sub-frames as used in technical schemes 1 and 2 are intended to explain the mapping method when multiple uplink sub-frames are scheduled, and they are also suitable for scheduling a single uplink sub-frame.

The First Configuration Approach

First, determining k, which is the number of the uplink sub-frames whose corresponding ACK/NACK messages are transmitted in the same downlink sub-frame, and renumbering the k uplink sub-frames (#0, . . . , #k−1), wherein the index of the uplink sub-frame where the user sends data is IndexUSF (i.e. #0, . . . , #k−1) after renumbering;

according to the sequence of the IndexUSF, serially connecting all physical resource blocks in the same position in all uplink sub-frames whose corresponding ACK/NACK messages need to be transmitted in the same downlink sub-frame together according to the IndexUSF and sequentially numbering them to get the indices of the physical resource blocks, i.e. serially connecting the first physical resource blocks in the first uplink sub-frame and the second uplink sub-frame and separately numbering them with #1 and #2, serially connecting the second physical resource blocks in the first uplink sub-frame and the second uplink sub-frame and separately numbering them with #3 and #4, so on and so forth, numbering all physical resource blocks in all uplink sub-frames to obtain the indices of the physical resource blocks;

then, according to the sequence of the index of each uplink sub-frame, uniformly allocating the indices of all physical resource blocks in all uplink sub-frames to all physical hybrid ARQ indicator channel groups to which all uplink sub-frames correspond, i.e. uniformly allocating the indices of the renumbered physical resource blocks to Ngroup physical hybrid ARQ indicator channel groups; sequentially mapping the indices of the corresponding physical resource blocks in a physical hybrid ARQ indicator channel group to the physical hybrid ARQ indicator channels in the group;

finally, adjusting positions between and inside the physical hybrid ARQ indicator channel groups according to the index of the cyclic shift for reference signal field to which the uplink data corresponds.

During actual implementation, the k uplink sub-frames are renumbered first (#0, ..., #k−1), whose corresponding ACK/NACK messages need to be transmitted in the same downlink sub-frame, assuming that the total number of available resource blocks within the current system bandwidth is NPRB, the total number of available physical hybrid ARQ indicator channel groups in the target downlink sub-frame is Ngroup, the index of the uplink sub-frame where the user sends data is IndexUSF after renumbering, the lowest numbering index of the physical resource blocks where the user sends data is Index1st PRB, the index of the cyclic shift for reference signal field to which the uplink data corresponds is IndexDMRS, in the target downlink sub-frame, the index of the physical hybrid ARQ indicator channel over which the ACK/NACK messages are sent is IndexPHICH, the index of the corresponding physical hybrid ARQ indicator channel group is Indexgroup, the index of the physical hybrid ARQ indicator channel within the physical hybrid ARQ indicator channel group is Indexlocal, and the number of physical hybrid ARQ indicator channels contained in a physical hybrid ARQ indicator channel group is Nlocal, then, according to the first configuration approach in technical scheme 2, the index of the physical hybrid ARQ indicator channel, i.e. the IndexPHICH, can be determined with the following formulae:

IndexPRB=Index1stPRB×$k$+IndexUSF

Indexgroup=(IndexPRB+IndexDMRS)mod $N$group

Indexlocal=($\lfloor$IndexPRB/$N$group$\rfloor$+IndexDMRS)mod $N$local

IndexPHICH=Indexgroup+Indexlocal×$N$group in the above definition, k=1, 2; Nlocal=8.

The Second Configuration Approach

First, determining k, which is the number of the uplink sub-frames whose corresponding ACK/NACK messages are transmitted in the same downlink sub-frame, and renumbering the k uplink sub-frames (#0, ..., #k−1), wherein the index of the uplink sub-frame where the user sends data is IndexUSF (i.e. #0, ..., #k−1) after renumbering;

according to the sequence of the IndexUSF, serially connecting all physical resource blocks in the same position in all uplink sub-frames whose corresponding ACK/NACK messages need to be transmitted in the same downlink sub-frame together according to the IndexUSF and sequentially numbering them to get the indices of the physical resource blocks, i.e. serially connecting the first physical resource blocks in the first uplink sub-frame and the second uplink sub-frame and separately numbering them with #1 and #2, serially connecting the second physical resource blocks in the first uplink sub-frame and the second uplink sub-frame and separately numbering them with #3 and #4, so on and so forth, numbering all physical resource blocks in all uplink sub-frames to obtain the indices of the physical resource blocks;

then, according to the sequence of the index of each uplink sub-frame, uniformly allocating the indices of all physical resource blocks in all uplink sub-frames in pairs to all physical hybrid ARQ indicator channel groups to which all uplink sub-frames correspond, i.e. according to the indexing sequence, uniformly allocating the indices of the renumbered physical resource blocks in pairs to Ngroup physical hybrid ARQ indicator channel groups; sequentially mapping the indices of the corresponding physical resource blocks in a physical hybrid ARQ indicator channel group to the physical hybrid ARQ indicator channels in the group;

finally, adjusting positions between and inside the physical hybrid ARQ indicator channel groups according to the index of the cyclic shift for reference signal field to which the uplink data corresponds.

During actual implementation, the k uplink sub-frames are renumbered first (#0, ..., #k−1), whose corresponding ACK/NACK messages are transmitted in the same downlink sub-frame, assuming that the total number of available resource blocks within the current system bandwidth is NPRB, the total number of available physical hybrid ARQ indicator channel groups in the target downlink sub-frame is Ngroup, the index of the uplink sub-frame where the user sends data is IndexUSF after renumbering, the lowest numbering index of the physical resource blocks where the user sends data is Index1st PRB, the index of the cyclic shift for reference signal field to which the uplink data corresponds is IndexDMRS, in the target downlink sub-frame, the index of the physical hybrid ARQ indicator channel over which the ACK/NACK messages are sent is IndexPHICH, the index of the corresponding physical hybrid ARQ indicator channel group is Indexgroup, the index of the physical hybrid ARQ indicator channel within the physical hybrid ARQ indicator channel group is Indexlocal, and the number of physical hybrid ARQ indicator channels contained in a physical hybrid ARQ indicator channel group is Nlocal, then, according to the second configuration approach in technical scheme 2, the index of the physical hybrid ARQ indicator channel, i.e., the IndexPHICH, can be determined with the following formulae:

Indexgroup=(Index1stPRB+IndexDMRS)mod $N$group;

Indexlocal=($\lfloor$Index1stPRB/$N$group$\rfloor$×$k$+IndexUSF+IndexDMRS)mod $N$local;

IndexPHICH=Indexgroup+Indexlocal×$N$group; or

IndexPHICH=Indexgroup×$k$+IndexUSF+$\lfloor$Indexlocal/$k$$\rfloor$×$k$×$N$group;

in the above definition, k=1, 2; Nlocal=8.

Among the above mentioned four configuration approaches, the index of the physical resource block where the uplink data resides can be either the lowest number or the largest number among numbers of the physical resource blocks where the uplink data resides. The index of the physical resource block with the largest or lowest number marks the starting block or ending block of the physical resource blocks to which the uplink data in the uplink sub-frame corresponds.

Herein the lowest number refers to the lowest number in the allocated resource indices, for example, if the resources allocated to a target user are #2, #3, #4 and #5, the lowest number is 2, and the largest number is 5. The conception of the largest number is the same as that of the lowest number, the only difference is that the value of Index1st PRB is selected differently, i.e. the largest number and the lowest number can be replaced. Among the above mentioned four configuration approaches, the value of the index of the cyclic shift for reference signal field to which the uplink data corresponds can be set as 0, which is equivalent to saying that there is no such IndexDMRS variable in the expressions.

The present disclosure will be explained in more detail below based on the above mentioned technical schemes and configuration approaches, with reference to the frame structure illustrated in FIG. 1 and in combination with the specific application examples.

Application Example 1

Assuming that the total number of available physical resource blocks in the uplink sub-frame is 24, one physical hybrid ARQ indicator channel group contains 8 physical hybrid ARQ indicator channels, the ratio of the uplink sub-frames to the downlink sub-frames is 3:2, wherein the DwPTS can be deemed a special downlink sub-frame; the ACK messages of two uplink sub-frames are transmitted in the same downlink sub-frame, and the number of available physical hybrid ARQ indicator channel groups in the target downlink sub-frame is 6.

The first three physical hybrid ARQ indicator channel groups correspond to the indices of physical resource blocks in the first uplink sub-frame, and the last three physical hybrid ARQ indicator channel groups correspond to the indices of physical resource blocks in the second uplink sub-frame.

For the indices of physical resource blocks in each uplink sub-frame, according to the number of physical hybrid ARQ indicator channel groups to which each uplink sub-frame corresponds, which is 3, the indices of all physical resource blocks to which the uplink sub-frame corresponds are uniformly allocated to three groups, i.e.

the three physical hybrid ARQ indicator channel groups to which the first uplink sub-frame corresponds are:

the first physical hybrid ARQ indicator channel group including {#0, #3, #6, #9, #12, #15, #18, #21};

the second physical hybrid ARQ indicator channel group including {#1, #4, #7, #10, #13, #16, #19, #22};

the third physical hybrid ARQ indicator channel group including {#2, #5, #8, #11, #14, #17, #20, #23};

the three physical hybrid ARQ indicator channel groups to which the second uplink sub-frame corresponds are:

the fourth physical hybrid ARQ indicator channel group including {#24, #27, #30, #33, #36, #39, #42, #45};

the fifth physical hybrid ARQ indicator channel group including {#25, #28, #31, #34, #37, #40, #43, #46};

the sixth physical hybrid ARQ indicator channel group including {#26, #29, #32, #35, #38, #41, #44, #47};

then based on the indices of the physical resource blocks, the indices of physical resource blocks contained in each physical hybrid ARQ indicator channel group are sequentially matched to the physical hybrid ARQ indicator channels contained in the physical hybrid ARQ indicator channel group;

finally, positions between and inside the physical hybrid ARQ indicator channel groups are adjusted according to the index of the cyclic shift for reference signal field to which the uplink data corresponds, as shown in FIG. 2;

if the data sent by the target user is located on the third and fourth physical resource blocks in the second uplink sub-frame, its physical resource block indices are #3 and #4, and the index of its corresponding cyclic shift for reference signal field is 0, then $$IndexUSF = 1; Nlocal = 8; Ngroup = 3;$$

$$Index1st\ PRB = 3; IndexDMRS = 0;$$

$$\begin{aligned}Indexgroup &= (Index1st\ PRB + IndexDMRS)\ \text{mod}\ Ngroup + \\ &\quad Ngroup \times IndexUSF \\ &= (3+0)\ \text{mod}\ 3 + 3 \times 1 \\ &= 3;\end{aligned}$$

$$\begin{aligned}Indexlocal &= \left(\begin{array}{c}\lfloor Index1stPRB/Ngroup \rfloor + \\ IndexDMRS\end{array}\right)\ \text{mod}\ Nlocal \\ &= (\lfloor 3/3 \rfloor + 0)\ \text{mod}\ 8 \\ &= 1;\end{aligned}$$

$$\begin{aligned}IndexPHICH &= Ngroup \times Nlocal \times IndexUSF + Indexgroup - \\ &\quad Ngroup \times IndexUSF + Indexlocal \times Ngroup \\ &= 3 \times 8 \times 1 + 3 - 3 \times 1 + 1 \times 3 \\ &= 27.\end{aligned}$$

Application Example 2

Assuming that the total number of available physical resource blocks in the uplink sub-frame is 24, one physical hybrid ARQ indicator channel group contains 8 physical hybrid ARQ indicator channels, the ratio of the uplink sub-frames to the downlink sub-frames is 3:2, wherein the DwPTS can be deemed a special downlink sub-frame; the ACK messages of two uplink sub-frames are transmitted in the same downlink sub-frame, and the number of available physical hybrid sub-frames channel groups in the target downlink sub-frame is 6, the physical hybrid ARQ indicator channels are allocated according to the sequence of first indexing the uplink sub-frame numbers and then indexing physical resource blocks.

Figure 3:
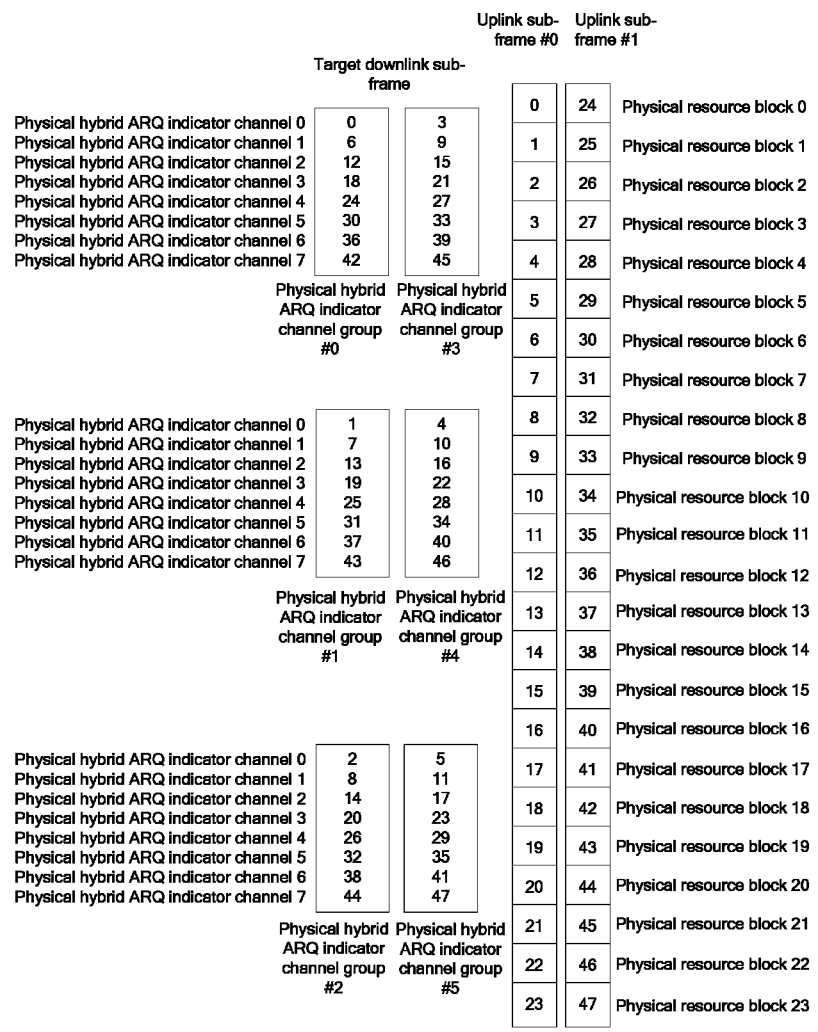
FIG. 3 is a schematic illustration of application example 2 of the method for allocating physical hybrid ARQ indicator channels of the present disclosure.

The physical resource blocks in all uplink sub-frames are renumbered to get Index1st PRB (#0, #1, . . . , #47) according to the sequence of first indexing the uplink sub-frame numbers and then indexing physical resource blocks, all physical resource blocks in all uplink sub-frames are renumbered and are uniformly allocated to 6 physical hybrid ARQ indicator channel groups, i.e.

the first physical hybrid ARQ indicator channel group includes {#0, #6, #12, #18, #24, #30, #36, #42};

the second physical hybrid ARQ indicator channel group includes {#1, #7, #13, #19, #25, #31, #37, #43};

the third physical hybrid ARQ indicator channel group includes {#2, #8, #14, #20, #26, #32, #38, #44};

the fourth physical hybrid ARQ indicator channel group includes {#3, #9, #15, #21, #27, #33, #39, #45};

the fifth physical hybrid ARQ indicator channel group includes {#4, #10, #16, #22, #28, #34, #40, #46};

the sixth physical hybrid ARQ indicator channel group includes {#5, #11, #17, #23, #29, #35, #41, #47};

then based on the indices of the physical resource blocks, the indices of physical resource blocks contained in each physical hybrid ARQ indicator channel group are sequentially matched to the physical hybrid ARQ indicator channels contained in the physical hybrid ARQ indicator channel group, e.g. the indices of physical resource blocks in the first physical hybrid ARQ indicator channel group {#0, #6, #12, #18, #24, #30, #36, #42} are matched one by one to the 0-7-th physical hybrid ARQ indicator channels;

finally, positions between and inside the physical hybrid ARQ indicator channel groups are adjusted according to the index of the cyclic shift for reference signal field to which the uplink data corresponds, as shown in FIG. 3;

for example, the data sent by the target user is located on the third and fourth physical resource blocks in the second uplink sub-frame, its physical resource block indices are #3 and #4, and the index of its corresponding cyclic shift for reference signal field is 0, then $$IndexUSF = 1; Nlocal = 8; Ngroup = 6;$$

$$Index1st\ PRB = 3; IndexDMRS = 0;$$

$$\begin{aligned} IndexPRB &= Index1stPRB + IndexUSF \times NPRB \\ &= 3 + 1 \times 24 \\ &= 27 \end{aligned}$$

$$\begin{aligned} Indexgroup &= (IndexPRB + IndexDMRS)\ \text{mod}\ Ngroup \\ &= (27 + 0)\ \text{mod}\ 6 \\ &= 3 \end{aligned}$$

$$\begin{aligned} Indexlocal &= (\lfloor IndexPRB/Ngroup \rfloor + IndexDMRS)\ \text{mod}\ Nlocal \\ &= (\lfloor 27/6 \rfloor + 0)\ \text{mod}\ 8 \\ &= 4 \end{aligned}$$

$$\begin{aligned} IndexPHICH &= Indexgroup + Indexlocal \times Ngroup \\ &= 3 \times 4 \times 6 \\ &= 27 \end{aligned}$$

Application Example 3

Assuming that the total number of available physical resource blocks in the uplink sub-frame is 24, one physical hybrid ARQ indicator channel group contains 8 physical hybrid ARQ indicator channels, the ratio of the uplink sub-frames to the downlink sub-frames is 3:2, wherein the DwPTS can be deemed a special downlink sub-frame; the ACK messages of two uplink sub-frames are transmitted in the same downlink sub-frame, and the number of available physical hybrid ARQ indicator channel groups in the target downlink sub-frame is 6.

The physical resource blocks in all uplink sub-frames are renumbered to get Index1st PRB (#0, #1, . . . , #47) according to the sequence of first indexing physical resource blocks and then indexing the uplink sub-frame numbers, the physical resource blocks in the uplink sub-frames are numbered according to the principle that the first resource block has the priority, i.e. the first resource blocks in the uplink sub-frames #1 and #2 are separately numbered with #1 and #2, so on and so forth for the numbering of subsequent resource blocks. The renumbered physical resource blocks are uniformly allocated to the 6 physical hybrid ARQ indicator channel groups according to the sequence of the indices of the physical resource blocks, i.e.

the first physical hybrid ARQ indicator channel group includes {#0, #6, #12, #18, #24, #30, #36, #42};

the second physical hybrid ARQ indicator channel group includes {#1, #7, #13, #19, #25, #31, #37, #43};

the third physical hybrid ARQ indicator channel group includes {#2, #8, #14, #20, #26, #32, #38, #44};

the fourth physical hybrid ARQ indicator channel group includes {#3, #9, #15, #21, #27, #33, #39, #45};

the fifth physical hybrid ARQ indicator channel group includes {#4, #10, #16, #22, #28, #34, #40, #46};

the sixth physical hybrid ARQ indicator channel group includes {#5, #11, #17, #23, #29, #35, #41, #47};

then based on the indices of the physical resource blocks, the indices of physical resource blocks contained in each physical hybrid ARQ indicator channel group are sequentially matched to the physical hybrid ARQ indicator channels contained in the physical hybrid ARQ indicator channel group;

finally, positions between and inside the physical hybrid ARQ indicator channel groups are adjusted according to the index of the cyclic shift for reference signal field to which the uplink data corresponds, as shown in FIG. 4;

for example, the resource sent by the target user is located on the third and fourth physical resource blocks in the second uplink sub-frame, its physical resource block indices are #3 and #4, and the index of its corresponding cyclic shift for reference signal field is 0, then $$k = 2; IndexUSF = 1; Nlocal = 8; Ngroup = 6;$$

$$Index1st\ PRB = 3; IndexDMRS = 0;$$

$$\begin{aligned} IndexPRB &= Index1stPRB \times k + IndexUSF \\ &= 3 \times 2 + 1 \\ &= 7 \end{aligned}$$

$$\begin{aligned} Indexgroup &= (IndexPRB + IndexDMRS)\ \text{mod}\ Ngroup \\ &= (7 + 0)\ \text{mod}\ 6 \\ &= 1 \end{aligned}$$

$$\begin{aligned} Indexlocal &= (\lfloor IndexPRB/Ngroup \rfloor + IndexDMRS)\ \text{mod}\ Nlocal \\ &= (\lfloor 7/6 \rfloor + 0)\ \text{mod}\ 8 \\ &= 1 \end{aligned}$$

$$\begin{aligned} IndexPHICH &= Indexgroup + Indexlocal \times Ngroup \\ &= 1 + 1 \times 6 \\ &= 7 \end{aligned}$$

Application Example 4

Assuming that the total number of available physical resource blocks in the uplink sub-frame is 24, one physical hybrid ARQ indicator channel group contains 8 physical hybrid ARQ indicator channels, the ratio of the uplink sub-frames to the downlink sub-frames is 3:2, wherein the DwPTS can be deemed a special downlink sub-frame; the ACK messages of two uplink sub-frames are transmitted in the same downlink sub-frame, and the number of available physical hybrid sub-frames channel groups in the target downlink sub-frame is 6.

First according to the indices of physical resource blocks and then according to the uplink sub-frame numbers, the physical resource blocks in the uplink sub-frames are numbered according to the principle that the first resource block has the priority, i.e. the first resource blocks in the uplink sub-frames #1 and #2 are separately numbered with 1 and 2, so on and so forth for the numbering of subsequent resource blocks. When the indices of the resource blocks are allocated to physical hybrid ARQ indicator channel groups, they are allocated sequentially and uniformly according to the indices of the physical resource blocks and based on a physical resource block pair as a unit, as shown in FIG. 5, e.g. the physical resource blocks #1 and #2 as a pair are allocated to the first channel group, the physical resource blocks #3 and #4 as a pair are allocated to the second channel group, then the physical hybrid ARQ indicator channels are allocated inside channel groups, where those ACK messages with the same physical resource block index are sent in the same physical hybrid ARQ indicator channel, as shown in FIG. 5.

The resource sent by the target user is located on the third and fourth physical resource blocks in the second uplink sub-frame, its physical resource block indices are #3 and #4, and the index of its corresponding cyclic shift for reference signal field is 0, then $$k = 2; \text{IndexUSF} = 1; \text{Nlocal} = 8; \text{Ngroup} = 6;$$

$$\text{Index1st PRB} = 3; \text{IndexDMRS} = 0;$$

$$\begin{aligned}\text{Indexgroup} &= (\text{Index1stPRB} + \text{IndexDMRS}) \bmod \text{Ngroup} \\ &= (3+0) \bmod 6 \\ &= 3\end{aligned}$$

$$\begin{aligned}\text{Indexlocal} &= \left(\begin{array}{l}\lfloor \text{Index1stPRB}/\text{Ngroup}\rfloor \times k + \\ \text{IndexUSF} + \text{IndexDMRS}\end{array}\right) \bmod \text{Nlocal} \\ &= (\lfloor 3/6 \rfloor \times 2 + 1 + 0) \bmod 6 \\ &= 1\end{aligned}$$

$$\begin{aligned}\text{IndexPHICH} &= \text{Indexgroup} \times k + \text{IndexUSF} + \lfloor \text{Indexlocal}/k \rfloor \times \\ & \quad k \times \text{Nlocal} \\ &= 3 \times 2 + 1 + \lfloor 1/2 \rfloor \times 2 \times 6 \\ &= 7\end{aligned}$$

The above mentioned descriptions are just embodiments of the present disclosure and are in no way intended to restrict the present disclosure; for those skilled in the art, the present disclosure can have various changes and variations. Any and all modifications, equivalent substitutes, and improvements, etc, made within the spirit and principle of the present disclosure shall all be included into the scope of claims of the present disclosure.

INDUSTRIAL APPLICABILITY

By applying the method for allocating physical hybrid ARQ indicator channels of the present disclosure, the index of the physical resource block where uplink data resides, the index of the cyclic shift for reference signal field to which the uplink data corresponds, and the index of the uplink sub-frame where the uplink data resides are used together to jointly indicate the index of the physical hybrid ARQ indicator channel used for transmitting the ACK/NACK message of the uplink data. Because of the addition of the index of the uplink sub-frame as compared to existing technologies, the method allows the allocation of physical hybrid ARQ indicator channels to be more accurate, avoids channel allocation conflicts, thereby being capable of reducing signaling overhead, and also being suitable for scenarios where the ratio of uplink time slots to downlink time slots is unequal.

The invention claimed is:

1. A method for allocating physical hybrid ARQ indicator channels in a time division duplex system, the method including:

sending, in the time division duplex system, indication information corresponding to multiple uplink sub-frames in a same downlink sub-frame, through an index of a physical resource block where uplink data resides as well as an index of an uplink sub-frame where the uplink data resides, determining, via at least one computer processor of the time division duplex system, an index of a physical hybrid ARQ indicator channel group where a physical hybrid ARQ indicator channel in an downlink sub-frame resides and an intra-group index of the physical hybrid ARQ indicator channel in the physical hybrid ARQ indicator channel group according to an indexing rule, and further determining an index of the physical hybrid ARQ indicator channel by using the index of the physical hybrid ARQ indicator channel group and the intra-group index; and wherein the indexing rule comprises one of the following:

first indexing according to uplink sub-frame numbers and then indexing according to physical resource blocks, or first indexing according to physical resource blocks and then indexing according to uplink sub-frame numbers.

2. The method for allocating physical hybrid ARQ indicator channels according to claim 1, wherein when determining the index of the physical hybrid ARQ indicator channel group where the physical hybrid ARQ indicator channel in the downlink sub-frame resides as well as the intra-group index of the physical hybrid ARQ indicator channel, it is also necessary to use an index of cyclic shift for reference signal field to which the uplink data corresponds.

3. The method for allocating physical hybrid ARQ indicator channels according to claim 2, wherein the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

4. The method for allocating physical hybrid ARQ indicator channels according to claim 2, wherein the index of the physical resource block where the uplink data in the uplink sub-frame resides is a physical resource block index with the largest number or a physical resource block index with the lowest number in the physical resource blocks where uplink data in an uplink sub-frame resides;

the physical resource block index with the largest or lowest number marks the starting block or ending block of the physical resource blocks to which the uplink data in the uplink sub-frame corresponds.

5. The method for allocating physical hybrid ARQ indicator channels according to claim 1, wherein when implementing allocation of specific physical hybrid ARQ indicator channels according to the indexing rule, the method includes:

determining k, which is the number of uplink sub-frames whose corresponding indication messages are transmitted in the same downlink sub-frame, and renumbering the k uplink sub-frames to get IndexUSF, which denotes an uplink sub-frame index;

determining the number of available physical hybrid ARQ indicator channel groups used for sending downlink indication messages in target downlink sub-frame, and continuously and uniformly allocating the available physical hybrid ARQ indicator channel groups to the k uplink sub-frames according to the sequence of the IndexUSF;

according to the sequence of the IndexUSF, sequentially numbering all physical resource blocks in one uplink sub-frame after another, and determining physical resource block indices for all physical resource blocks;

uniformly allocating the indices of all physical resource blocks in each uplink sub-frame to all physical hybrid ARQ indicator channel groups to which the uplink sub-frame corresponds, and sequentially mapping indices of corresponding physical resource blocks in a physical hybrid ARQ indicator channel group to physical hybrid ARQ indicator channels in the group;

adjusting positions between and inside the physical hybrid ARQ indicator channel groups according to the index of the cyclic shift for reference signal field to which the uplink data corresponds.

6. The method for allocating physical hybrid ARQ indicator channels according to claim 5, wherein the allocation method specifically includes:

determining k that is the number of the uplink sub-frames, and renumbering the k uplink sub-frames to get IndexUSF, determining NPRB that is the total number of available resource blocks within a current system bandwidth, Index1st PRB that is the lowest numbering index of the physical resource blocks where uplink data in the uplink sub-frame resides, and IndexDMRS that is the index of the cyclic shift for reference signal field to which the uplink data corresponds;

determining Ngroup that is the total number of available physical hybrid ARQ indicator channel groups when the downlink sub-frame only corresponds to one uplink sub-frame as well as Nlocal that is the number of physical hybrid ARQ indicator channels contained in one physical hybrid ARQ indicator channel group;

then determining Indexgroup, which is an index of a physical hybrid ARQ indicator channel group in the downlink sub-frame, with the following expression:

Indexgroup=(Index1stPRB+IndexDMRS)mod $N$group+$N$group×IndexUSF;

determining Indexlocal, which is an index of a channel in the physical hybrid ARQ indicator channel group, with the following expression:

Indexlocal=($\lfloor$Index1stPRB/$N$group$\rfloor$+IndexDMRS) mod $N$local;

further ultimately determining IndexPHICH, which is the index of the physical hybrid ARQ indicator channel, with the following expression:

IndexPHICH=Indexgroup+Indexlocal×$N$group; or

IndexPHICH=$N$group×$N$local×IndexUSF+Indexgroup−$N$group×IndexUSF+Indexlocal×$N$group;

where the $\lfloor\ \rfloor$ means rounding-down, and the operator mod means modulo operation.

7. The method for allocating physical hybrid ARQ indicator channels according to claim 6, wherein the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

8. The method for allocating physical hybrid ARQ indicator channels according to claim 5, wherein the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

9. The method for allocating physical hybrid ARQ indicator channels according to claim 1, wherein when implementing allocation of specific physical hybrid ARQ indicator channels according to the indexing rule, the method includes:

determining k, which is the number of uplink sub-frames whose corresponding downlink indication messages are transmitted in the same downlink sub-frame, and renumbering the k uplink sub-frames to get IndexUSF, which denotes an uplink sub-frame index;

according to the sequence of the IndexUSF, serially connecting physical resource blocks in all uplink sub-frames whose corresponding indication messages need to be transmitted in the same downlink sub-frame together and sequentially numbering them to get the indices of the physical resource blocks;

according to the sequence of the index of each uplink sub-frame, uniformly allocating the indices of all physical resource blocks in all uplink sub-frames to all physical hybrid ARQ indicator channel groups to which all uplink sub-frames correspond, and sequentially mapping the indices of corresponding physical resource blocks in a physical hybrid ARQ indicator channel group to the physical hybrid ARQ indicator channels in the group;

finally, adjusting positions between and inside the physical hybrid ARQ indicator channel groups according to the index of the cyclic shift for reference signal field to which the uplink data corresponds.

10. The method for allocating physical hybrid ARQ indicator channels according to claim 9, wherein the allocation method specifically includes:

determining k that is the number of the uplink sub-frames, and renumbering the k uplink sub-frames to get IndexUSF;

determining NPRB that is the total number of available resource blocks within a current system bandwidth, Index1st PRB that is the lowest numbering index of the physical resource blocks where uplink data in the uplink sub-frame resides, and IndexDMRS that is the index of the cyclic shift for reference signal field to which the uplink data corresponds;

determining Ngroup that is the total number of available physical hybrid ARQ indicator channel groups in the downlink sub-frame as well as Nlocal that is the number of physical hybrid ARQ indicator channels contained in one physical hybrid ARQ indicator channel group;

then first determining IndexPRB, which is an index of a physical resource block in the uplink sub-frame, with the following expression:

IndexPRB=Index1stPRB+IndexUSF×NPRB determining Indexgroup, which is an index of a physical hybrid ARQ indicator channel group in the downlink sub-frame, with the following expression:

Indexgroup=(IndexPRB+IndexDMRS)mod $N$group;

determining Indexlocal, which is an index of a channel in the physical hybrid ARQ indicator channel group, with the following expression:

Indexlocal=($\lfloor$IndexPRB/$N$group$\rfloor$+IndexDMRS)mod $N$local;

further ultimately determining IndexPHICH, which is the index of the physical hybrid ARQ indicator channel, with the following expression:

IndexPHICH=Indexgroup+Indexlocal×$N$group;

where the $\lfloor\ \rfloor$ means rounding-down, and the operator mod means modulo operation.

11. The method for allocating physical hybrid ARQ indicator channels according to claim 10, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

12. The method for allocating physical hybrid ARQ indicator channels according to claim 9, wherein
the uplink sub-frames are continuous uplink sub-frames, the number of the uplink sub-frames k is 1 or 2, and Nlocal which is the number of the physical hybrid ARQ indicator channels contained in a physical hybrid ARQ indicator channel group is 8;
the value of the index of the cyclic shift for reference signal field to which the uplink data corresponds is 0.

13. The method for allocating physical hybrid ARQ indicator channels according to claim 9, wherein
the numbering rule for renumbering the k uplink sub-frames to get IndexUSF is:
successively numbering the k uplink sub-frames with 0, ..., k−1, and the range of values of IndexUSF being from 0 to k−1.

14. The method for allocating physical hybrid ARQ indicator channels according to claim 9, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

15. The method for allocating physical hybrid ARQ indicator channels according to claim 9, wherein
the index of the physical resource block where the uplink data in the uplink sub-frame resides is a physical resource block index with the largest number or a physical resource block index with the lowest number in the physical resource blocks where uplink data in an uplink sub-frame resides;
the physical resource block index with the largest or lowest number marks the starting block or ending block of the physical resource blocks to which the uplink data in the uplink sub-frame corresponds.

16. The method for allocating physical hybrid ARQ indicator channels according to claim 1, wherein when implementing allocation of specific physical hybrid ARQ indicator channels according to the indexing rule, the method includes:
determining k, which is the number of uplink sub-frames whose corresponding indication messages are transmitted in the same downlink sub-frame, and renumbering the k uplink sub-frames to get IndexUSF, which denotes an uplink sub-frame index;
according to the sequence of the IndexUSF, serially connecting all physical resource blocks in the same position in all uplink sub-frames together according to the IndexUSF and sequentially numbering them to get the indices of the physical resource blocks;
according to the sequence of the index of each uplink sub-frame, uniformly allocating the indices of all physical resource blocks in all uplink sub-frames to all physical hybrid ARQ indicator channel groups to which all uplink sub-frames correspond; and sequentially mapping the indices of corresponding physical resource blocks in a physical hybrid ARQ indicator channel group to the physical hybrid ARQ indicator channels in the group;
finally, adjusting positions between and inside the physical hybrid ARQ indicator channel groups according to the index of the cyclic shift for reference signal field to which the uplink data corresponds.

17. The method for allocating physical hybrid ARQ indicator channels according to claim 16, wherein the allocation method specifically includes:
determining k that is the number of the uplink sub-frames, and renumbering the k uplink sub-frames to get IndexUSF;
determining NPRB that is the total number of available resource blocks within a current system bandwidth, Index1st PRB that is the lowest numbering index of the physical resource blocks where uplink data in the uplink sub-frame resides, and IndexDMRS that is the index of the cyclic shift for reference signal field to which the uplink data corresponds;
determining Ngroup that is the total number of available physical hybrid ARQ indicator channel groups in the downlink sub-frame as well as Nlocal that is the number of physical hybrid ARQ indicator channels contained in one physical hybrid ARQ indicator channel group;
then first determining IndexPRB, which is an index of a physical resource block in the uplink sub-frame, with the following expression:

IndexPRB=Index1stPRB×k+IndexUSF;

determining Indexgroup, which is an index of a physical hybrid ARQ indicator channel group in the downlink sub-frame, with the following expression:

Indexgroup=(IndexPRB+IndexDMRS)mod Ngroup;

determining Indexlocal, which is an index of a channel in the physical hybrid ARQ indicator channel group, with the following expression:

Indexlocal=(⌊IndexPRB/Ngroup⌋+IndexDMRS)mod Nlocal;

further ultimately determining IndexPHICH, which is the index of the physical hybrid ARQ indicator channel, with the following expression:

IndexPHICH=Indexgroup+Indexlocal×Ngroup;

where the ⌊ ⌋ means rounding-down, and the operator mod means modulo operation.

18. The method for allocating physical hybrid ARQ indicator channels according to claim 17, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

19. The method for allocating physical hybrid ARQ indicator channels according to claim 17, wherein
the uplink sub-frames are continuous uplink sub-frames, the number of the uplink sub-frames k is 1 or 2, and Nlocal which is the number of the physical hybrid ARQ indicator channels contained in a physical hybrid ARQ indicator channel group is 8;
the value of the index of the cyclic shift for reference signal field to which the uplink data corresponds is 0.

20. The method for allocating physical hybrid ARQ indicator channels according to claim 17, wherein
the numbering rule for renumbering the k uplink sub-frames to get IndexUSF is:
successively numbering the k uplink sub-frames with 0, ..., k−1, and the range of values of IndexUSF being from 0 to k−1.

21. The method for allocating physical hybrid ARQ indicator channels according to claim 17, wherein the index of the physical resource block where the uplink data in the uplink sub-frame resides is a physical resource block index with the largest number or a physical resource block index with the lowest number in the physical resource blocks where uplink data in an uplink sub-frame resides;

the physical resource block index with the largest or lowest number marks the starting block or ending block of the physical resource blocks to which the uplink data in the uplink sub-frame corresponds.

22. The method for allocating physical hybrid ARQ indicator channels according to claim 16, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

23. The method for allocating physical hybrid ARQ indicator channels according to claim 1, wherein when implementing allocation of specific physical hybrid ARQ indicator channels according to the indexing rule, the method includes:
determining k, which is the number of uplink sub-frames whose corresponding indication messages are transmitted in the same downlink sub-frame, and renumbering the k uplink sub-frames to get IndexUSF, which denotes an uplink sub-frame index;
according to the sequence of the IndexUSF, serially connecting all physical resource blocks in the same position in all uplink sub-frames together according to the IndexUSF and sequentially numbering them to get the indices of the physical resource blocks;
according to the sequence of the index of each uplink sub-frame, uniformly allocating the indices of all physical resource blocks in all uplink sub-frames in pairs to all physical hybrid ARQ indicator channel groups to which all uplink sub-frames correspond; and sequentially mapping the indices of corresponding physical resource blocks in a physical hybrid ARQ indicator channel group to the physical hybrid ARQ indicator channels in the group;
finally, adjusting positions between and inside the physical hybrid ARQ indicator channel groups according to the index of the cyclic shift for reference signal field to which the uplink data corresponds.

24. The method for allocating physical hybrid ARQ indicator channels according to claim 23, wherein the allocation method specifically includes:
determining k that is the number of the uplink sub-frames and renumbering the k uplink sub-frames to get IndexUSF;
determining NPRB that is the total number of available resource blocks within a current system bandwidth, Index1st PRB that is the lowest numbering index of the physical resource blocks where the uplink data in the uplink sub-frame resides, and IndexDMRS that is the index of the cyclic shift for reference signal field to which the uplink data corresponds;
determining Ngroup that is the total number of available physical hybrid ARQ indicator channel groups in the downlink sub-frame as well as Nlocal that is the number of physical hybrid ARQ indicator channels contained in one physical hybrid ARQ indicator channel group;
then determining Indexgroup, which is an index of a physical hybrid ARQ indicator channel group in the downlink sub-frame, with the following expression:

Indexgroup=(Index1stPRB+IndexDMRS)mod $N$group;

determining Indexlocal, which is an index of a channel in the physical hybrid ARQ indicator channel group, with the following expression:

Indexlocal=($\lfloor$Index1stPRB/$N$group$\rfloor$×$k$+IndexUSF+ IndexDMRS)mod $N$local;

further ultimately determining IndexPHICH, which is the index of the physical hybrid ARQ indicator channel, with the following expression:

IndexPHICH=Indexgroup+Indexlocal×$N$group; or

IndexPHICH=Indexgroup×$k$+IndexUSF+$\lfloor$Indexlocal/ $k\rfloor$×$k$×$N$group;

where the $\lfloor\ \rfloor$ means rounding-down, and the operator mod means modulo operation.

25. The method for allocating physical hybrid ARQ indicator channels according to claim 24, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

26. The method for allocating physical hybrid ARQ indicator channels according to claim 24, wherein
the uplink sub-frames are continuous uplink sub-frames, the number of the uplink sub-frames k is 1 or 2, and Nlocal which is the number of the physical hybrid ARQ indicator channels contained in a physical hybrid ARQ indicator channel group is 8;
the value of the index of the cyclic shift for reference signal field to which the uplink data corresponds is 0.

27. The method for allocating physical hybrid ARQ indicator channels according to claim 24, wherein
the numbering rule for renumbering the k uplink sub-frames to get IndexUSF is:
successively numbering the k uplink sub-frames with 0, . . . , k−1, and the range of values of IndexUSF being from 0 to k−1.

28. The method for allocating physical hybrid ARQ indicator channels according to claim 24, wherein
the index of the physical resource block where the uplink data in the uplink sub-frame resides is a physical resource block index with the largest number or a physical resource block index with the lowest number in the physical resource blocks where uplink data in an uplink sub-frame resides;
the physical resource block index with the largest or lowest number marks the starting block or ending block of the physical resource blocks to which the uplink data in the uplink sub-frame corresponds.

29. The method for allocating physical hybrid ARQ indicator channels according to claim 23, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

30. The method for allocating physical hybrid ARQ indicator channels according to claim 1, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

31. The method for allocating physical hybrid ARQ indicator channels according to claim 1, wherein the index of the physical resource block where the uplink data in the uplink sub-frame resides is a physical resource block index with the largest number or a physical resource block index with the lowest number in the physical resource blocks where uplink data in an uplink sub-frame resides;

the physical resource block index with the largest or lowest number marks the starting block or ending block of the physical resource blocks to which the uplink data in the uplink sub-frame corresponds.

32. The method for allocating physical hybrid ARQ indicator channels according to claim 1, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

33. The method for allocating physical hybrid ARQ indicator channels according to claim 1, wherein
the indication information corresponding to multiple uplink sub-frames sent in the same downlink sub-frame in the time division duplex system is an Acknowledged (ACK) or a Non-acknowledged (NACK) message responding to the uplink data in the uplink sub-frame.

34. The method for allocating physical hybrid ARQ indicator channels according to claim 1, wherein
the uplink sub-frames are continuous uplink sub-frames, the number of the uplink sub-frames k is 1 or 2, and Nlocal which is the number of the physical hybrid ARQ indicator channels contained in a physical hybrid ARQ indicator channel group is 8;

the value of the index of the cyclic shift for reference signal field to which the uplink data corresponds is 0.

35. The method for allocating physical hybrid ARQ indicator channels according to claim 1, wherein
the numbering rule for renumbering the k uplink sub-frames to get IndexUSF is:
successively numbering the k uplink sub-frames with $0, \ldots, k-1$, and the range of values of IndexUSF being from 0 to $k-1$.

36. The method for allocating physical hybrid ARQ indicator channels according to claim 1, wherein
the index of the physical resource block where the uplink data in the uplink sub-frame resides is a physical resource block index with the largest number or a physical resource block index with the lowest number in the physical resource blocks where uplink data in an uplink sub-frame resides;

the physical resource block index with the largest or lowest number marks the starting block or ending block of the physical resource blocks to which the uplink data in the uplink sub-frame corresponds.

* * * * *

UNITED STATES PATENT AND TRADEMARK OFFICE
CERTIFICATE OF CORRECTION

PATENT NO.       : 8,681,667 B2                                      Page 1 of 1
APPLICATION NO.  : 12/919665
DATED            : March 25, 2014
INVENTOR(S)      : Dai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this

Twenty-ninth Day of September, 2015

Michelle K. Lee
*Director of the United States Patent and Trademark Office*